Figure 5:
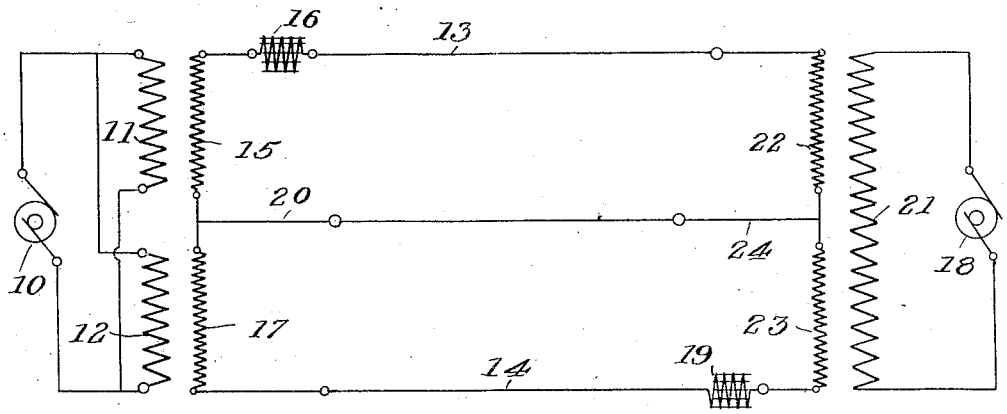

W. F. GRADOLPH & W. C. HAHNE.
TRANSMISSION OF ELECTRICAL ENERGY.
APPLICATION FILED DEC. 20, 1905.
959,337
Patented May 24, 1910.
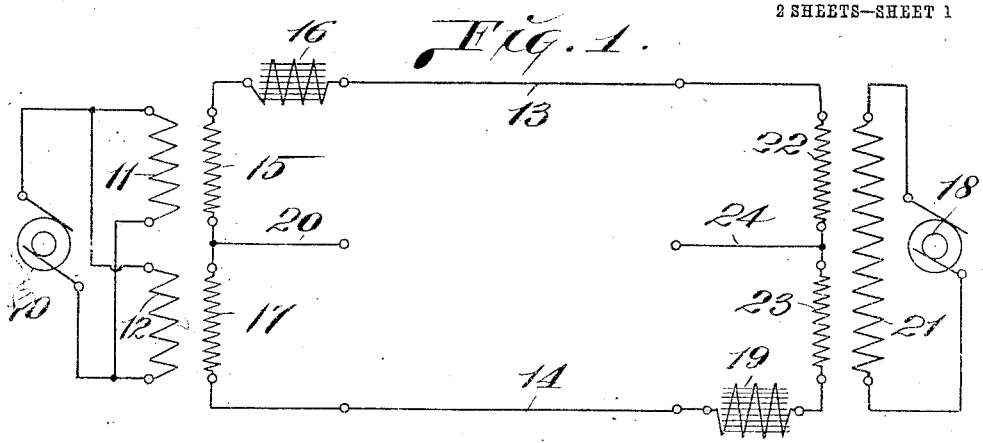
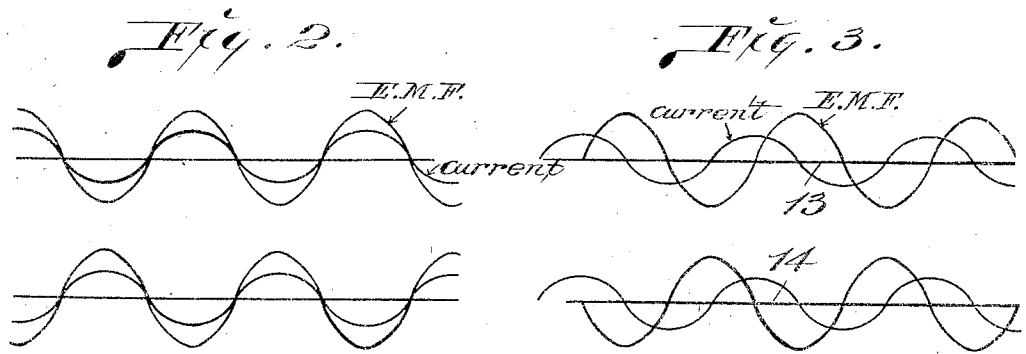
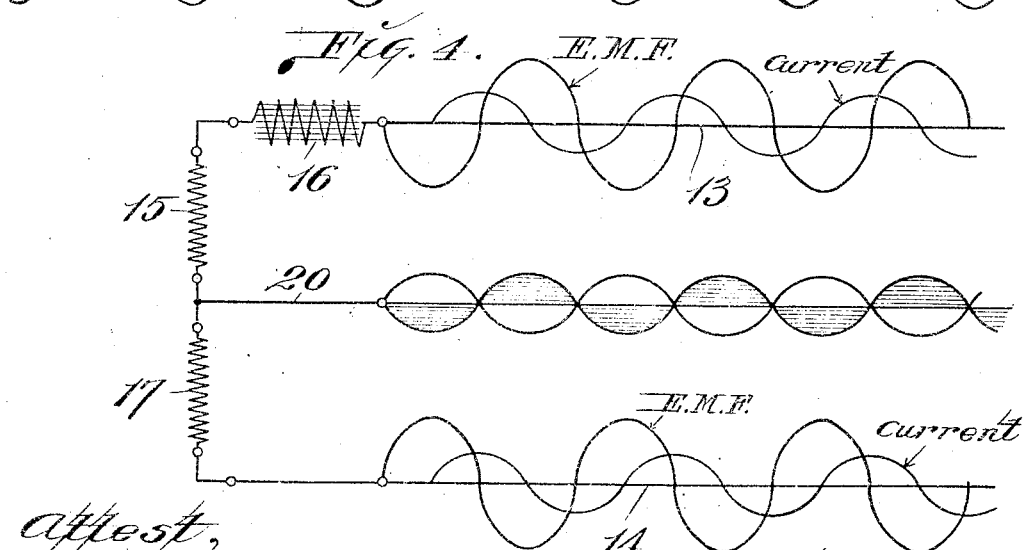
Inventors,
Wm. F. Gradolph and Wm. C. Hahne.

UNITED STATES PATENT OFFICE.

WILLIAM F. GRADOLPH, OF ST. LOUIS, MISSOURI, AND WILLIAM C. HAHNE, OF CHICAGO, ILLINOIS, ASSIGNORS TO GRADOLPH ELECTRIC COMPANY, OF ST. LOUIS, MISSOURI, A CORPORATION OF MISSOURI.

TRANSMISSION OF ELECTRICAL ENERGY.

959,337.       Specification of Letters Patent.    Patented May 24, 1910.

Application filed December 20, 1905. Serial No. 292,529.

*To all whom it may concern:*

Be it known that we, WILLIAM F. GRADOLPH, a resident of the city of St. Louis, in the State of Missouri, and WILLIAM C. HAHNE, a resident of Chicago, in the county of Cook and State of Illinois, both citizens of the United States, have invented certain new and useful Improvements in Transmission of Electrical Energy, of which the following is a specification, reference being had to the drawing accompanying and forming part of the same.

Our invention relates to the transmission of electrical energy by means of alternating or undulating currents, and briefly stated, our primary object is to overcome certain well known difficulties which have heretofore limited the distance over which the current can be successfully transmitted.

Our invention is applicable to a great variety of generating and translating devices, for instance, the transmission of power, for telephony and for electric signaling.

In the transmission of a simple electrical wave over an electrical conductor of great length characterized by high resistance, electrostatic capacity and inductive leakages, the energy lost or dissipated is proportional to and expressible in simple terms of the reactive constants of the system, and there is no distortion of the wave form.

Our method of transmission of electrical energy for any purpose whatever reduces, by a much greater degree than by any previous means, the self or static induction of the line, thus very greatly increasing the distance over which successful transmission of electrical energy can be accomplished; and, moreover, the practice of our method necessitates but slight, if any, change in the external circuit as it exists under the approved practice of the present time.

In the transmission of alternating, undulating, or intermittent currents, it is well known that the high capacity of closely associated conductors is a great hindrance to economic transmission and a preventive of transmission through underground cables of any great length. It has been proposed for a number of years, to obviate the excessive charging current existing in a circuit of this kind, by introducing into the circuit in various manners reactance coils which should cause the current of equal and opposite effect to the capacity current in the circuit, and annul it. None of these proved effectual when tried in actual service until recently, when the theory of the design and placing of such "loading" coils was evolved, and it was found that if they were arranged in series with the conductors, at proper intervals, which are determinable by mathematics, the efficiency of transmission was increased. There are many disadvantages of this arrangement, however, prominent among which is the expense of the coils themselves, and in underground cable work, the expense of the frequent building of vaults and boxes to contain these coils. To this we may add the difficulty of access to these coils which are embedded in an insulating compound and cannot be repaired without removing the entire containing box, and the difficulty due to magnetic induction between different circuits due to the overlapping magnetic fields of these reactive coils.

The line losses in a power transmission circuit, due to self and static induction, are of vital importance; and, inasmuch as our invention overcomes these effects to so considerable a degree, we are enabled to deliver to the translating device, whatever it may be, a larger proportion of the generated current than has, so far as we are aware, been possible in the systems heretofore proposed.

The nature of our invention will be more readily comprehended in connection with the preferred type of apparatus, and, therefore, reference will now be made to the accompanying drawing, wherein said apparatus is illustrated diagrammatically.

Figure 6:
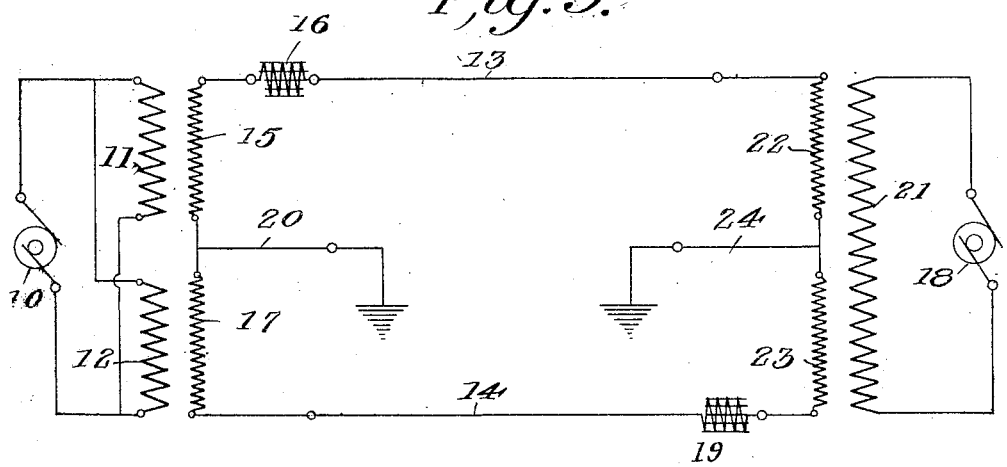

Figure 1 shows a system involving the application of our invention for industrial power purposes; Fig. 2 is a diagram showing graphically the current waves when in phase, as in the ordinary practice of alternating currents—illustrating the phase relation of currents in the ordinary circuit containing only resistance; Fig. 3 is a diagram showing current waves as displaced in phase by our invention, the current on one side leading by approximately 90° while on the other side it lags approximately 90°, and has no reference to the E. M. F., as current only can be displaced; Fig. 4 is a diagram which shows graphically the condition of the current waves in the external circuit, arising from the application of our invention, Figs. 5 and 6 are diagrammatic views illustrating systems embodying our invention, differing in some of their details from that illustrated in Fig. 1.

As shown in the drawing, Fig. 1 is a diagram which illustrates a simple way of applying our invention in a single phase system in which the translating device is a motor, and, for the sake of clearness, all stepdown transformers, rectifiers, or other apparatus, which may be desirable to use in actual practice, are omitted.

Referring by numerals to the accompanying drawings:—10 designates a single phase generator, with which the primary transformer windings 11 and 12 are connected in multiple.

13 and 14 designate the two line wires, the former of which is connected to the secondary winding 15 through the choke or impedance coil 16, and the latter is connected directly to the secondary winding 17.

18 designates the translating apparatus, which, in the present instance, is a motor, and at that end of the circuit in the line 14 is placed a choke or impedance coil 19.

Connected with the central or neutral point between the secondary windings 15 and 17 is the surging or buffer line 20, and, in accordance with the broad spirit of our invention, this line may be grounded as indicated in Fig. 6 or connected with the translating apparatus as indicated in Fig. 5, or may be kept open as indicated in Fig. 1, which latter plan we consider preferable; and, if such be the case, the length of the surging line is by preference somewhat greater than a wave length.

21 designates the secondary winding of the transformer, which is connected to the translating apparatus; 22 and 23 the primary windings, to which are respectively connected the conductors 13 and 14 of the external circuit; and connected to and leading from the central or neutral point between these primary windings 22 and 23 is a surging or buffer line 24, which is in length somewhat greater than a wave length, and which may be grounded; or, in some instances, it may be connected to the surging line 20.

The operation of this system is, to the best of our knowledge and belief, as follows: The currents produced by the generator 10 passing through the primary coils 11 and 12 are, by induction, reproduced in the secondary coils 15 and 17; and these induced currents being in phase would, in a simple single phase circuit, add up; but the line 20, slightly greater than a wave length, permits a surge or wave to take place in it, thus performing what might be termed, the function of a buffer, so that the independence of the two secondary currents is preserved. The current from the secondary winding 15 is, by the impedance coil 16, caused to lag approximately 90° behind the E. M. F., while the current in the opposite line 14 flowing from the secondary coil 17 is by the electrostatic capacity or condenser effect of the lines 13 and 14 and the surging line 20 caused to lead the E. M. F. by approximately 90°, throughout the entire line 14 until the impedance 19 is reached. The result is an out-of-phase condition in lines 13 and 14 to the extent of approximately 180° between the two currents, as graphically illustrated in Figs. 3 and 4.

Fig. 2 illustrates the phase relation of currents flowing in a circuit which contains only resistance, and the current at any instant is proportional to the instantaneous value of the impressed E. M. F. It is seen that the waves pass through zero and reach their maximum values at the same instant and are said to be in phase, and it will be further noted that the polarity of the current wave in one line is always of contrary sign to the current wave in the other—that is to say the direction, at any instant, of the current flow in one line is opposite to that of the current flow in the other line. On the other hand, it will be noted that in Figs. 3 and 4, which represent what would be the ideal conditions of our method or system, the polarities in the two lines are always of the same sign—that is, the direction of the current flow, at any instant, in one line is the same as that in the other—and consequently if such ideal conditions could be attained in practice, the self induction and capacity effect between the lines would be zero. By providing the surging line 20, the currents in the lines 13 and 14 are in effect independent. The result is that the impedance 16 affects only the current in line 13, while the condenser action of the lines 14 and 20 affects only the current in the latter; and, for this reason, the phase in line 13 is retarded, while in line 14 the phase is advanced, and the waves are transmitted over the circuit, with a phase relation at least approaching that shown in Figs. 3 and 4. The surging lines 20 and 24 combined with the lines 13 and 14 and the various coils therein form two practically independent circuits, and by the particular arrangement of the impedance coils 16 and 19 the current flowing through one circuit is caused to lag approximately 90° behind the E. M. F., while the current in the opposite circuit flows unimpeded until the end of the circuit is reached, where it is impeded, thus bringing about a difference of potential and restoring the conditions originally set up in the secondary coils at the end of the circuit provided with the generator. When the currents, which are approximately 180° out of phase, reach the primary coils 22 and 23 of the translating apparatus 18 at the end of the line, the impedance 19 adjacent the primary coil 23 causes the phase relation to be restored at least partially to the original relation, so that there is produced a difference of potential across the transformer, comprising the coils 21, 22, and 23, and the current waves are consequently restored to their original conditions and in such conditions delivered to the motor or other translating device. To be more specific, in the operation of our system, reference being had to Fig. 1 of the drawings, when energy is applied to the primary windings 11 and 12 it induces a current in the secondary windings 15 and 17. Winding 15 sends the current out over the line 13 through the impedance coil 16 and out over the surging line 20, while coil 17 sends the current out over the line 14 and surging line 20. It is obvious that the current generated in coil 15 will send a positive or negative impulse, whichever the case may be, out over line 13, and of the opposite polarity on line 20. Likewise, when a current is generated in the coil 17, a positive or negative impulse, whichever the case may be, is sent out over lines 14 and 20, and at all times will the currents generated by the coils 15 and 17 be either positive or negative at the same instant on the lines 13 and 14, due to the action of the impedance 16, in conjunction with that of capacity existing on the lines 13, 14 and 20. It is therefore possible that part of the energy set up by the coil 15 will pass out over the circuits 13 and 20 without taking the paths 17 and 14, and again, part of the energy set up by the coil 17 will pass out over 14 and 20 without taking the paths 15 and 13. It is obvious that we may consider that part of the energy of the coil 15 takes in each place the paths 16, 13 and 20, and that part of the energy of coil 17 takes in each place the paths 14, 17 and 20, in which case an independent action of coils 15 and 17 is preserved.

It is believed from numerous tests and experiments of this system that its successful operation depends upon the impedance and the surging or buffer lines 20 and 24 and the capacity conditions existing between the lines 13 and 14, 13 and 20, and 14 and 20 and their inductive relations to each other.

It will be understood, of course, that the more nearly the currents in the two lines are kept 180° out of phase, and the more nearly they are brought into phase at the translating device, the greater percentage of energy is delivered to said translating device, and, it is, therefore, desirable to approximate these conditions as far as possible.

It may be stated that while the line conductors may be in any position relative to each other, they must, in every instance, be arranged in inductive relation to the surging line, for the reason that any action between this line and the transmission lines is essential to the successful operation of the system.

It will be understood that where the surging line extends to the translating device, the line conductors, if in inductive relation thereto, are also in inductive relation to each other.

We do not in this case claim the process or method of transmitting electrical energy herein disclosed, as that has been made the subject of application, No. 553,976, filed by us on the 7th day of April 1910, as a division of this case.

What we claim is:

1. In a system for the transmission of electrical energy, a source of alternating currents, a metallic circuit, the lines of which are in inductive relation to each other, an impedance device located in one of the said lines, and a surging line in inductive relation to both of the said lines, the said impedance and surging line coöperating to alter the normal phase relation of the current in one line relative to that in the other, substantially as set forth.

2. In a system for the transmission of electrical energy over a metallic circuit, the lines of which are in inductive relation to each other, a source of alternating currents, an impedance device located in one of the lines of the circuit and arranged to cause a lag in the phase of the current in that line, and a non-continuous or incomplete metallic circuit in inductive relation to the two lines of the circuit arranged to alter the normal phase relations of the current in the two lines of the working circuit.

3. In a system for the transmission of electrical energy over a metallic circuit, the two lines of which are in inductive relation to each other, a source of alternating currents, impedances located respectively in series with the lines and near the opposite ends of the said circuits, and surging lines in inductive relation to both lines of the said circuit and arranged respectively near each end of the circuit for altering the normal phase relations of the currents in the lines of the circuit and causing the transmitted currents to be of like polarity on both lines of the circuit, and for restoring the currents to their original polarity at the receiving end of the line.

4. In a system for the transmission of electrical energy, the combination of a source of alternating currents, translating apparatus, a circuit, the sides of which are in inductive relation to each other, connecting the said source of current and translating apparatus, an impedance near the current supply end of the circuit and a surging line in inductive relation to the lines of the circuit for changing the normal phase relation of the currents in the two lines of the circuit, and another impedance near the other end of the circuit and a surging line in inductive relation to the circuit, for restoring the phase relation at the translating apparatus.

5. In a system for the transmission of electrical energy, the combination with a source of single phase currents, translating apparatus, and a circuit, the sides of which are in inductive relation to each other, connecting said source of currents and the translating apparatus, of means located near the end of the circuit at which is the source of currents for retarding the phase of the current in one side of the circuit, means also located near the aforesaid end of the circuit, in inductive relation to and coöperating with one line of the circuit to advance the phase of the current in the other side of the circuit, and means located near the current delivery end of the circuit, substantially similar to the aforesaid means at the current-supply end of the circuit but oppositely disposed with reference to the lines of the circuit, for restoring the phase relations before the current is delivered to the translating apparatus.

6. In a system for the transmission of electrical energy, the combination with a source of single phase currents, a transformer having primary windings connected in multiple with each other and in series with the said source, a secondary circuit, and translating apparatus in the circuit, of means in one side of the secondary circuit adjacent to the transformer to retard the phase of the currents in said side, a surging line in inductive relation to both sides of the circuit extending from the neutral point of the secondary winding of the transformer and means for restoring the phase relation of the currents in the two sides of the circuit at the translating apparatus, as set forth.

7. In a system for the transmission of electrical energy, a source of alternating currents, a circuit the sides of which are in inductive relation to each other, an impedance coil in each side or line of the said circuit, located respectively near the end where is the source of current supply and near the other end the impedances in the two sides of the circuit being thus rendered unsymmetric, and a surging line in inductive relation to both sides of the said circuit.

8. In a system for the transmission of electrical energy, a generator, a circuit, the sides of which are in inductive relation to each other, an impedance located in one side of said circuit adjacent the generator, a surging line located adjacent the source of generation, a translating apparatus, an impedance located in the opposite side of said circuit adjacent the translating apparatus, and a surging line located adjacent the translating apparatus.

9. In a system for the transmission of electrical energy, the combination with a source of alternating currents, translating means, a metallic circuit connecting the source of currents and the translating means, the sides of which are in inductive relation to each other, an impedance in each line of the circuit arranged adjacent to the source of currents and the translating means respectively and surging lines in inductive relation to both sides of the said circuit near the opposite ends thereof, the said parts coöperating to first produce in both sides of the said circuit at the same time currents of like polarity, and then to restore said currents to their original polarity before being delivered to the translating means.

10. In a system for the transmission of electrical energy, the combination with a source of single phase currents, translating means, a metallic circuit connecting the source of currents and the translating means, the sides of which circuit are in inductive relation to each other, an impedance in series with the line which constitutes one side of the circuit and in the end thereof where is located the source of current supply, a surging line in inductive relation to both sides of the circuit at the said end, the said parts coöperating to retard the current delivered to the line in one side of the circuit and correspondingly advancing it in the other side thereof, and an impedance located in the opposite line of the circuit from that in which is located the first mentioned impedance, and in the end of the circuit in which is the translating means and a surging line in inductive relation with both lines of the circuit at the end where is located the translating means, the last said parts coöperating to retard the advanced current and advance the retarded current.

W. F. GRADOLPH.
W. C. HAHNE.

Witnesses:
S. S. DUNHAM,
THOS. J. BYRNES.